(12) United States Patent
Osentoski et al.

(10) Patent No.: US 6,763,344 B1
(45) Date of Patent: Jul. 13, 2004

(54) METHOD OF AND SYSTEM FOR DYNAMICALLY CONTROLLING ACCESS TO DATA RECORDS

(75) Inventors: Dennis D. Osentoski, Highland Village, TX (US); Randall A. Stark, Grapevine, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,295

(22) Filed: Apr. 14, 2000

(51) Int. Cl.[7] ............................................. G06F 17/30

(52) U.S. Cl. ..................... 707/1; 707/3; 707/7; 707/9

(58) Field of Search ........... 707/9, 7, 10; 713/200–202, 713/185, 3, 9, 7

(56) References Cited

U.S. PATENT DOCUMENTS

| | | | |
|---|---|---|---|
| 5,404,294 A | 4/1995 | Karnik | 364/419.1 |
| 5,987,480 A | 11/1999 | Donohue et al. | 707/501 |
| 6,085,191 A * | 7/2000 | Fisher et al. | 707/9 |
| 6,226,745 B1 * | 5/2001 | Wiederhold | 713/200 |
| 6,253,203 B1 * | 6/2001 | O'Flaherty et al. | 707/9 |
| 6,275,825 B1 * | 8/2001 | Kobayashi et al. | 707/9 |

* cited by examiner

*Primary Examiner*—Jean M. Corrielus
*Assistant Examiner*—Baoquoc N. To
(74) *Attorney, Agent, or Firm*—Karl O. Hesse; Norman L. Gundel

(57) ABSTRACT

A system for controlling access to records stored in a database queries the database to obtain an initial result set of records. The method then applies access rules to the records of the initial result set to obtain a final result set of records. Then, the method provides access to records of the final result set according to an access profile for the user requesting the records.

10 Claims, 2 Drawing Sheets

METHOD OF AND SYSTEM FOR DYNAMICALLY CONTROLLING ACCESS TO DATA RECORDS

FIELD OF THE INVENTION

The present invention relates generally to the field of database record access control, and more specifically to a method of and system for controlling access to records in a data store based upon dynamically configurable access rules.

DESCRIPTION OF THE PRIOR ART

In constructing data store applications to be marketed to certain industries, it is highly beneficial to allow customers the ability to dynamically create logic rules that can be applied against data records as the records are retrieved from a data store. An example of such an application is a health record data store, for use by healthcare providers, hospitals, insurance companies, and the like, in which medical records are stored. These medical records include diagnosis and treatment records for various patents. The records contain information on the nature, date, and location of the diagnosis or treatment.

Medical records in general are highly private and sensitive. Additionally, there are stigmas associated with certain medical conditions, such as sexually transmitted diseases, HIV, substance abuse, and psychological or psychiatric conditions. The knowledge of diagnoses of or treatments for such conditions can have potentially harmful of discriminatory consequence for the person receiving such diagnosis or treatment. Accordingly, only persons having a need to know should have access to medical records in general, and access to medical records containing particularly sensitive information should be highly restricted.

Currently, access to records is controlled either by filtering logic in the application or by tagging each record with a security code or classification when the record is entered into the data store. The security classification is determined with reference to current good practice or governmental regulations. However, good practice and governmental regulations tend to change and evolve over time. New regulations are being written all the time. Information that may be considered relatively non-sensitive at one time may come to be considered highly sensitive at a later time. Thus, complex rule logic may change over time. Logic code imbedded in the product may require recompilation either by the customer or the product provider in order to implement new rules. Records tagged with a security identifier applied at the time the records were stored would require migration in order to implement changed access rules.

SUMMARY OF THE INVENTION

The present invention provides a method of and system for controlling access to records stored in a database. The method of the present invention queries the database to obtain an initial result set of records. The method of the present invention then applies access rules to the records of the initial result set to obtain a final result set of records. Then, the method of the present invention provides access to records of the final result set according to a user profile for the user requesting the records.

The records are stored in the database with a base value protection code. The method of the present invention tags the records of the initial result set by changing the base value protection code to a final protection code based upon the application of the access rules. The user profile includes at least one protection code and a level of access corresponding to the protection code. The records of the final result set are provided to the user according to the user profile and the final protection code to each record.

DESCRIPTION OF THE PREFERRED EMBODIMENT

Figure 1:
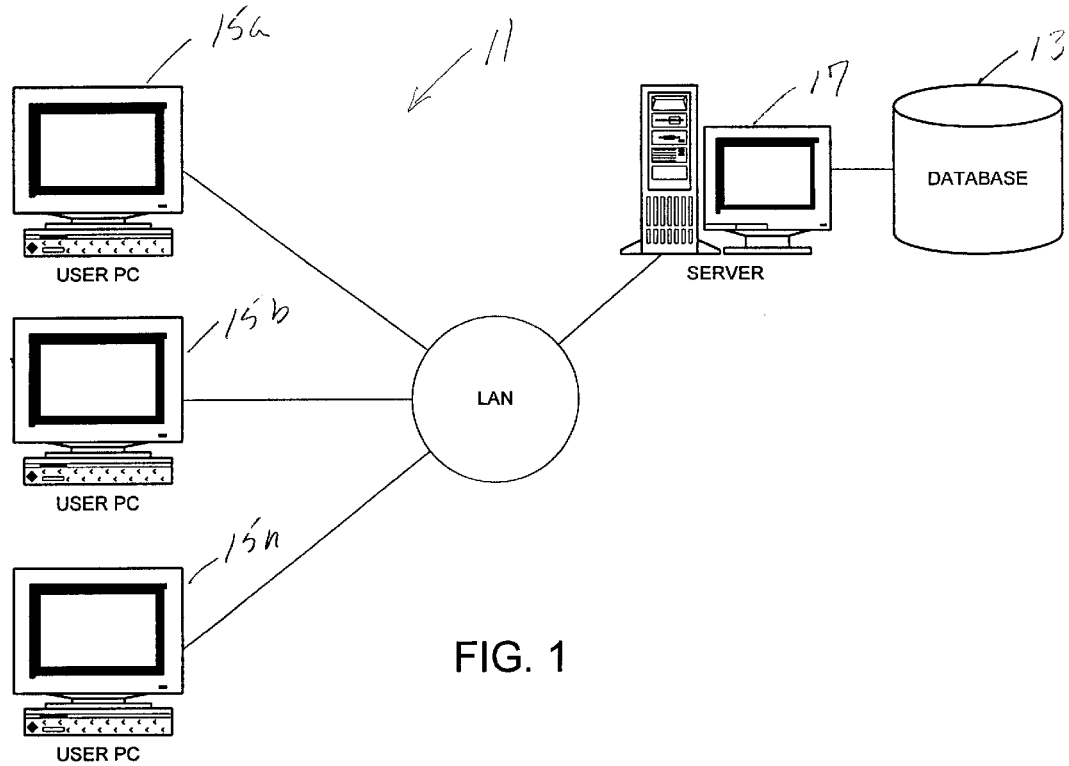
FIG. 1 is block diagram of a system according to the present invention.

Referring now to the drawings and first to FIG. 1, a system according to the present invention is designated generally by the numeral 11. System 11 includes a database 13 for storing a plurality of data records. In the preferred embodiment, system 11 is implemented in a local area network (LAN) environment in which data records stored in database 13 are accessed through a server 17 by users operating user personal computers (PCs) 15. For purposes of illustration, system 11 will be described with reference to a medical record access system. However, system 11 may be used in connection with any type of record access system.

Figure 2:
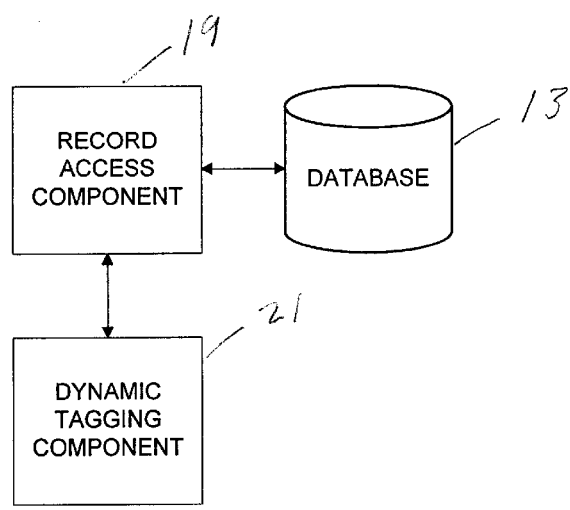
FIG. 2 is a component diagram of a record access system according to the present invention.

As illustrated in FIG. 2, system 11 includes a record access component 19 and a dynamic tagging component 21. In the preferred embodiment, components 19 and 21 are implemented in software running on server 17. As will be explained in detail hereinafter, record access component 19 is adapted to provides access to records stored in database 13. Users log on to the record access system from user PCs 15 using standard logon security practices.

When a user logs on, the record access component security tables are accessed to determine the user's access privilege and an access profile is created for the user. An example of a user profile is illustrated in the following Table I.

TABLE I

| Type of Data | Protect_Cd | Access |
|---|---|---|
| Diagnosis | H | Read |
| Diagnosis | K | Read/Write |
| Diagnosis | L | Read/Write |
| Procedure | H | Read |
| . . . | . . . | . . . |

The user profile contains columns for type of data, protection code (Protect_Cd), and access level. In the medical record embodiment of the present invention, the data types include diagnosis records and treatment records. The each protection code corresponds to an access level. Thus, in Table I, the user can read, but not modify, a diagnosis record with a protection code of H. The user can read and modify a diagnosis record with a protection code of K. It should be recognized that there can be other protection codes that deny read access to certain records, or selectively hide or suppress data in certain records.

After the user has logged on to record access system 11, the user can request records. For example, a user can request the diagnosis records for a particular patient. Upon receipt of a request, the record access component constructs a query to database 13. Database 13 returns an initial result set of the type illustrated in the following Table II.

TABLE II

| Patient | Diag_Cd | Facil. | Type | Date | Protect_Cd |
|---|---|---|---|---|---|
| P00001 | 300 | 0001 | A | 1996-01-01 | X |
| P00001 | 100 | 0002 | C | 1997-05-01 | X |
| P00001 | 200 | 0002 | D | 1998-05-01 | X |
| P00001 | 350 | 0003 | F | 1999-01-01 | X |
| P00001 | 490 | 0002 | E | 1999-08-15 | X |

The initial result set of Table II includes diagnosis records for patient P00001. Each diagnosis record includes a diagnosis code (Diag_Cd), which is a number corresponding to a diagnosis, a facility identifier (Facil.), a type, and the date of the diagnosis.

Each diagnosis record also contains a protection code (Protect_Cd), which defines the level of access for the record. In the preferred embodiment of the present invention, a security policy table is defined in the system that contains one entry for each type of data record. The security policy table associates a unique base protection code with each data type. The security policy table indicates the default access for all users to each type of data. In Table II, each record has a base protection code of X.

In the preferred embodiment, the system has predefined data types. An example of a predefined data type is Diagnosis. However, the system administrator may determine that additional, special, data types are required. The system administrator may create new data types, such as HIV Diagnosis or STD Diagnosis, via a graphical user interface. As new data types are created, new protection codes are created off the base, giving the administrator the ability to uniquely protect these new data types.

After database 13 has returned the initial result set, record access component 19 calls dynamic tagging component 21. Dynamic tagging component queries a rule set of the type illustrated in the following Table III for rules pertaining to data of the initial result set.

TABLE III

| Type | Rule | Protect_Cd |
|---|---|---|
| Diag. | (diag_cd = '100') or facil. = '0001' | K |
| Diag. | (facil. in ('0003', '0004') | H |
| Diag. | (type = 'D') | M |
| ... | ... | ... |

As shown Table III, the rules set includes a set of rules written as structured query language (SQL) statements. Each rule of Table III is associated with a protection code (Protect_Cd). Dynamic tagging component 21 uses the rules set to construct an in-memory SQL statement that applies the rules set against the initial result set. A system administrator can thus easily define access rules using SQL syntax.

The dynamic tagging component uses the results of the application of the rules set to dynamically recalculate the protection code for each record of the initial result set to form a final result set as illustrated in the following Table IV.

TABLE IV

| Patient | Diag_Cd | Facil. | Type | Date | Protect_Cd |
|---|---|---|---|---|---|
| P00001 | 300 | 0001 | A | 1996-01-01 | K |
| P00001 | 100 | 0002 | C | 1997-05-01 | K |

TABLE IV-continued

| Patient | Diag_Cd | Facil. | Type | Date | Protect_Cd |
|---|---|---|---|---|---|
| P00001 | 200 | 0002 | D | 1998-05-01 | M |
| P00001 | 350 | 0003 | F | 1999-01-01 | H |
| P00001 | 490 | 0002 | E | 1999-08-15 | X |

The tagging is done by building an SQL "with" construct that contains the determining values from each row and "where" construct(s) that contain the customer rules that pertain to the data type. The "cast" construct is used to tag each record which indicates which "where" construct was satisfied. At the end of this query, each record is appropriately classified, either remaining in the base protection code X, or in a new protection code (e.g. H, K, or M). The final result set is passed back through a security component of record access component 19 that uses the requesting user's access profile (Table I) to determine the user's access level (i.e., None, Read, Read/Write, Read/Write/Delete) to the records of the final result set. In the example of Table IV, only records with protections code (Protect_Cd) H, K, and L will be returned to the user, and only the K and L records may be updated by the user.

Figure 3:
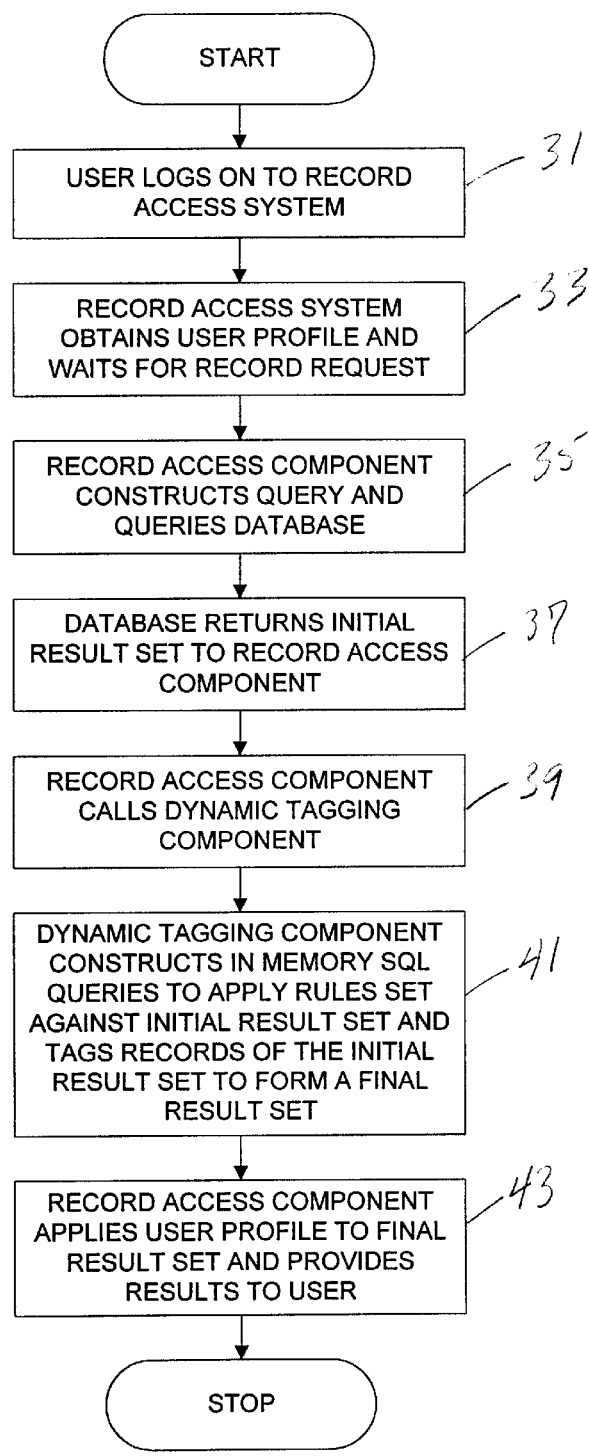
FIG. 3 is a flowchart of processing according to the present invention.

The operation of the method and system of the present invention is summarized with respect to the flowchart of FIG. 3. A user logs on to the record access system at block 31. The record access system obtains the access profile for the user and waits for a record request at block 33. When the record access component receives a record request, the record access component queries the database, at block 35. The database returns an initial result set, at block 37, and the record access component calls the dynamic tagging component, at block 39. The dynamic tagging component constructs an in-memory SQL query to apply the rules of the rules set against the record of the initial result set and tags the records of the initial result set to form a final result set, at block 41. The record access component applies the user's access profile to the final result set and provides the results to the user, at block 43.

From the foregoing, it may be seen that the present invention overcomes the shortcomings of the prior art. Access rules are defined by SQL statements in the rules set. The system administrator can add or modify access rules easily without having to recompile the system, as in the prior art method of imbedding logic rules in the data store application. All records are added to the database with the same base protection code. Final protection codes are applied to the records of the initial result set. Thus, the data migration issue of the prior art is solved by deferring the tagging of data until the records are actually retrieved from the data store.

The method and system of the present invention have been illustrated and described with respect to a presently preferred embodiment. Those skilled in the art, given the benefit of this disclosure, will recognize alternative embodiments. Accordingly, the foregoing disclosure is intended for purposes of illustration rather than limitation.

What is claimed is:

1. A method of controlling access to records stored in a database, which comprises the computer implemented steps of:

querying said database to obtain an initial result set of database records;

applying access rules to the database records of said initial result set by tagging each record of said initial result set with a final protection code based upon said rules to obtain a final result set of database records; and, providing access to records of said final result set based upon a user access profile.

2. The method as claimed in claim 1, wherein said step of providing access to said records of said final result set includes the step providing access to said records of said final result set based upon said user profile and said final protection code for each record of said final result set.

3. The method as claimed in claim 2, wherein said user profile includes at least one protection code and a level of access corresponding to said at least one protection code.

4. The method as claimed in claim 1, wherein each record of said initial set of records includes a base value protection code.

5. The method as claimed in claim 4, wherein said step of tagging each record of said initial set includes the step of changing said base value protection code to a final protection code based upon said rules.

6. A system for controlling access to records, which comprises:

a database for storing records;

a record access component for retrieving an initial set of database records from said database based upon a query and providing access to records of a final set of dynamically tagged database records based upon a user access profile;

a dynamic tagging component for tagging each record in said initial set of records with a protection code based upon access rules to form said final set of dynamically tagged records.

7. The system as claimed in claim 6, wherein said user profile includes at least one protection code and an access level associated with said at least one protection code.

8. The system as claimed in claim 6, wherein records are stored in said database with a base protection code.

9. The system as claimed in claim 8, wherein said dynamic tagging component is adapted to replace said base protection code of each record of said initial set of records with a protection code based upon the application of a rule to said record.

10. The system as claimed in claim 6, wherein said dynamic tagging component contains a set of rules for applying a final protection code to a record based upon the contents of said record.

* * * * *